(12) United States Patent
Margolin et al.

(10) Patent No.: US 7,216,537 B2
(45) Date of Patent: May 15, 2007

(54) FIBER OPTIC FLAMMABLE LIQUID MEASURING SYSTEM

(75) Inventors: Mark Margolin, Highland Park, IL (US); Malcolm Hodge, Chicago, IL (US)

(73) Assignee: Optosense Technologies, Inc., Northbrook, IL (US)

( * ) Notice: Subject to any disclaimer, the term of this patent is extended or adjusted under 35 U.S.C. 154(b) by 46 days.

(21) Appl. No.: 11/001,726

(22) Filed: Dec. 2, 2004

(65) Prior Publication Data

US 2006/0117846 A1 Jun. 8, 2006

(51) Int. Cl.
*G01F 23/30* (2006.01)

(52) U.S. Cl. ............................. 73/314; 73/313; 73/309; 73/311; 73/290 R

(58) Field of Classification Search ................. 73/313, 73/309, 311, 314, 290 R
See application file for complete search history.

(56) References Cited

U.S. PATENT DOCUMENTS

| | | | |
|---|---|---|---|
| 4,065,226 A * | 12/1977 | Campbell | 417/40 |
| 4,169,656 A | 10/1979 | Hodge | |
| 4,314,760 A | 2/1982 | Hodge et al. | |
| 4,796,469 A | 1/1989 | Brown et al. | |
| 4,804,944 A * | 2/1989 | Golladay et al. | 340/624 |
| 4,819,484 A | 4/1989 | White | |
| 5,026,984 A | 6/1991 | Gerdt | |
| 5,347,864 A * | 9/1994 | Senghaas et al. | 73/313 |
| 5,729,206 A * | 3/1998 | Divens | 340/618 |
| 5,950,487 A * | 9/1999 | Maresca et al. | 73/293 |
| 6,012,337 A | 1/2000 | Hodge | |
| 6,181,841 B1 | 1/2001 | Hodge | |
| 6,397,674 B1 * | 6/2002 | Kerchaert et al. | 73/314 |
| 6,453,741 B1 | 9/2002 | Beck, II | |
| 6,476,377 B1 | 11/2002 | Hodge | |
| 6,487,914 B1 | 12/2002 | Hodge | |
| 6,490,921 B2 | 12/2002 | Hagiwara | |
| 6,546,797 B2 * | 4/2003 | Burns | 73/314 |
| 6,606,905 B2 | 8/2003 | Carroll et al. | |
| 6,647,161 B1 | 11/2003 | Hodge | |
| 6,703,600 B1 | 3/2004 | Hodge | |
| 6,715,350 B2 | 4/2004 | Roberts | |
| 6,748,805 B2 | 6/2004 | Lease | |
| 2005/0235749 A1 * | 10/2005 | Morris | 73/313 |

* cited by examiner

*Primary Examiner*—Hezron Williams
*Assistant Examiner*—Rodney Frank
(74) *Attorney, Agent, or Firm*—Patzik, Frank & Samotny Ltd.

(57) ABSTRACT

An optical liquid measuring system for measuring the amount of flammable liquid in a storage tank consisting of a pair of encoder disks that are operatively connected to a pair of floats through a pair of pulley systems. The floats are designed so that the first float will float on top of flammable liquid such as gasoline, and the second float will float on top of water. Optical encoder reader heads or optical connectors are located proximate to the respective encoder disks to receive light that is reflected by or transmitted through the encoder disks. The optical connectors include a plurality of optical fibers that receive the light from the encoder disks and transmits signals to a CPU. The CPU then takes the information derived from the received signals and uses an algorithm to accurately calculate the amount of gasoline and water in the storage tank.

30 Claims, 3 Drawing Sheets

FIBER OPTIC FLAMMABLE LIQUID MEASURING SYSTEM

FIELD OF INVENTION

The invention relates to systems for measuring the fluid level in storage containers or tanks, and more particularly, to an optical liquid measurement system consisting of encoder disks and optical fibers to determine the level of two different fluids in storage containers or tanks.

BACKGROUND OF INVENTION

Gasoline filling stations and other entities often store gasoline or other flammable liquids in storage tanks or containers that are commonly underground. As it is important to know how much liquid is present in the storage tank, and an individual generally cannot visually see how much liquid is in the storage tank, various methods have been used to measure the amount of liquid in the tank.

One of the most common methods to measure the liquid in storage tanks is to use a dipstick that is inserted and then removed from the storage tank. While this may provide a general estimate of the amount of fluid in the storage tank in some circumstances, it is both cumbersome to use and subjective in how the fluid level is read. Use of a dipstick also often allows water to enter the storage tanks. As the dipstick is only designed to measure the amount of liquid in the storage tank, use of a dipstick will not take into consideration the amount of water or other contaminants that are present in the storage tank, which will further skew the measurement. Failing to determine the amount of water in the storage tanks can also lead to financial loss to the owner as possible leaks may not be readily detected and EPA fines may be levied.

Traditional devices for sensing or providing information on fluid levels have generally been analog devices that had limited accuracy. Many of the prior systems also utilized electrical parts that created hazards due to the volatile nature of the gasoline or flammable liquid.

Therefore, there is a need for a system and method that can accurately and safely determine the amount of gasoline or other flammable fluids in storage tanks, while being economical and easy to manufacture and install.

SUMMARY OF INVENTION

The present invention is an improvement over the prior systems for measuring the fluid level in storage tanks in that the way that the system of the present invention safely detects the amount of a flammable liquid in a storage tank is new and improved over the prior art. In particular, the system disclosed herein utilizes two floats having densities that allow the first float to float on the flammable liquid and the second float to float on water and/or other liquid contaminants in the storage tank. Each of the floats is preferably operatively connected to a rotatable sprocket or toothed pulley wheel by a chain, belt, tether or the like (hereinafter "chain"). A drone pulley wheel may be located adjacent each of the sprockets so that the rim of the pulley wheel contacts the chain and/or the teeth of the sprocket to prevent the chain from slipping. In a preferred embodiment the floats travel within perforated guide tubes to inhibit lateral drift or movement to provide for more accurate measurements. Precision for measuring the levels of fluids may be adjusted by changes the capstan diameter of the encoder disks.

In one embodiment, counterweights are attached to the other ends of the chains to balance the floats and maintain tautness in the chains. Alternately, the chains may also extend around a respective second sprocket or toothed pulley located within the storage tank whereby a loop is formed about the sprockets. The system may also utilize a pair of pulley wheels attached to or near the end of a telescoping bracket so that they are located within the storage tank at or near the bottom. In this embodiment, each float is attached to the end of its respective chain so that when the chain is extended about the pulley, the float will float on top of the gasoline or water. In order to maintain tautness in the chains, individual springs are preferably operatively attached to the ends of the chains about the sprockets.

The sprockets are attached to a shaft or cylinder that is rotatably connected to the inside walls of the storage tank or a structure inside the storage tank. Encoder disks comprising reflective masks are also attached to the corresponding shafts or cylinder so that rotation of the sprockets also rotates the corresponding encoder disk. In order to isolate and protect the encoder disk and other optical parts, an environmental barrier or enclosure preferably encloses each encoder disk and other optical parts, with one side of the barrier positioned between a sprocket and the corresponding encoder disk. In order to permit the shafts to rotatably connect the encoder disks and sprockets, the shafts each extend through a hole in the respective barrier that is sealed with a gasket or other known means that permit the shafts to rotate.

Optical encoder reader heads or optical connectors are located proximate each of the encoder disks. In a preferred embodiment, the optical connectors are integral with the cover of the storage tank. Each of the reader heads or optical connectors has a plurality of optical fibers associated therewith. In one embodiment, three optical fibers are used wherein two fibers transmit or deliver light to the encoder disk that is reflected back from the encoder disk in a known way, and the third optical fiber receives the reflected light. It is also appreciated that the light may be generated by a light emitting diode ("LED") or a laser. The optical fibers may then transmit signals to a central processing unit (CPU) of a computer or other receiving device to enable remote determination of the amount of fluid in the storage tank.

In operation, when either of the floats moves vertically within its respective guide tube, the respective chain will also move, thereby rotating the corresponding sprocket and encoder disk. Fiber optic cables will then receive light signals that are reflected by or transmitted through the encoder disk and transmit those signals to the CPU. With the size and dimensions of the storage tank already inputted into the CPU, the CPU can then accurately calculate the amount of gasoline and water in the storage tank using a simple algorithm.

It is therefore an object of the present invention to provide a new and improved system and method for determining the fluid level in storage containers or tanks that provides a safe and continuous readout.

Another object of the present invention is to provide a new and improved system and method for determining the fluid level in storage containers that provides a substantially accurate reading of the actual fluid level in the storage containers.

Yet another object of the present invention is to provide a new and improved system and method for determining the fluid level in storage containers that provides for substantially instantaneous verification of the amount of fluid filled into the storage container.

It is yet another object of the present invention is to provide a new and improved system and method for determining the fluid level in storage containers or tanks that allows for remote monitoring.

Other objects, features and advantages of the invention will be apparent from the following detailed disclosure, taken in conjunction with the accompanying sheets of drawings, wherein like reference numerals refer to like parts.

DETAILED DESCRIPTION OF DRAWINGS

Figure 2:
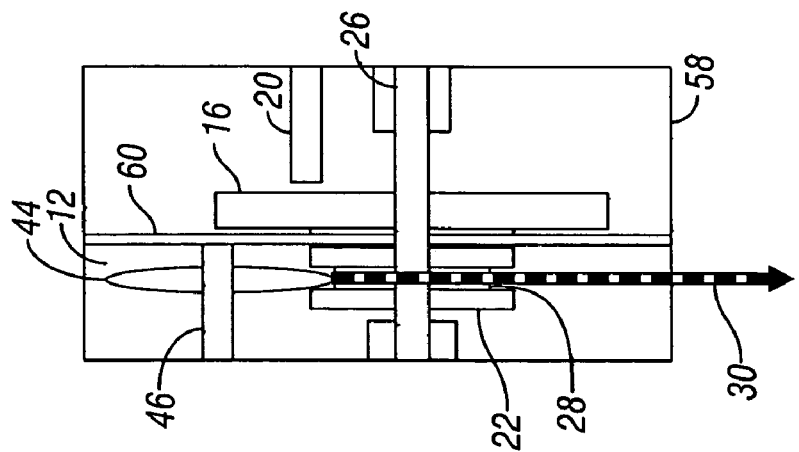
FIG. 2 is side plan view illustrating the sprocket, drone pulley wheel and encoder disk shown in FIG. 1 being rotatably attached to the storage tank.
Figure 3:
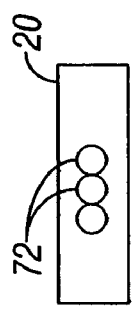
FIG. 3 is a front plan view of the optical connector of FIG. 1 showing three fiber-optic cables.

While this invention is susceptible of embodiment in many different forms, there is shown in the drawings and will herein be described in detail several specific embodiments, with the understanding that the present disclosure is to be considered merely an exemplification of the principles of the invention and the application is limited only to the appended claims.

Referring now to the drawings, and in particular to FIGS. 1 through 4, an embodiment of the optical liquid measuring device of the present invention, generally designated by the reference number 10, is shown and disclosed for use in connection with a storage tank or container 12. The optical liquid measuring device preferably comprises a pulley system, generally designated by the reference number 14, a pair of optical encoder disks 16, 18 and an optical encoder reader head or optical connector 20.

The pulley system 14 preferably comprises two pulleys wheels or sprockets 22, 24 for separately determining the amount of flammable liquid and the amount of water present in the storage tank. In a preferred embodiment, the flammable liquid is gasoline, however, it is appreciated that the amount of other flammable liquids may be measured and not depart from the scope of the present invention. Additionally, it is appreciated that the system may determine the amount of other liquids in addition or instead of water, provided that the density of the liquids is known.

Figure 1:
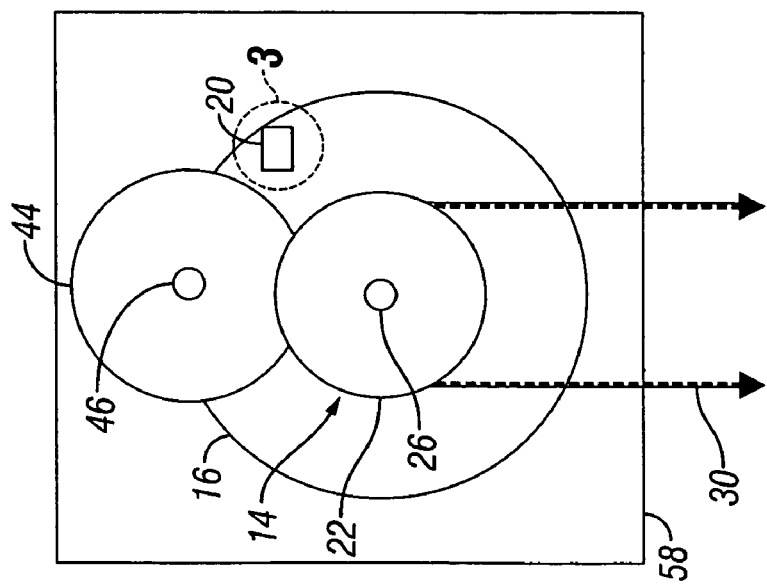
FIG. 1 is a front plan view of a sprocket, drone pulley wheel and encoder disk of one embodiment of a liquid measuring system of the present invention.
Figure 4:
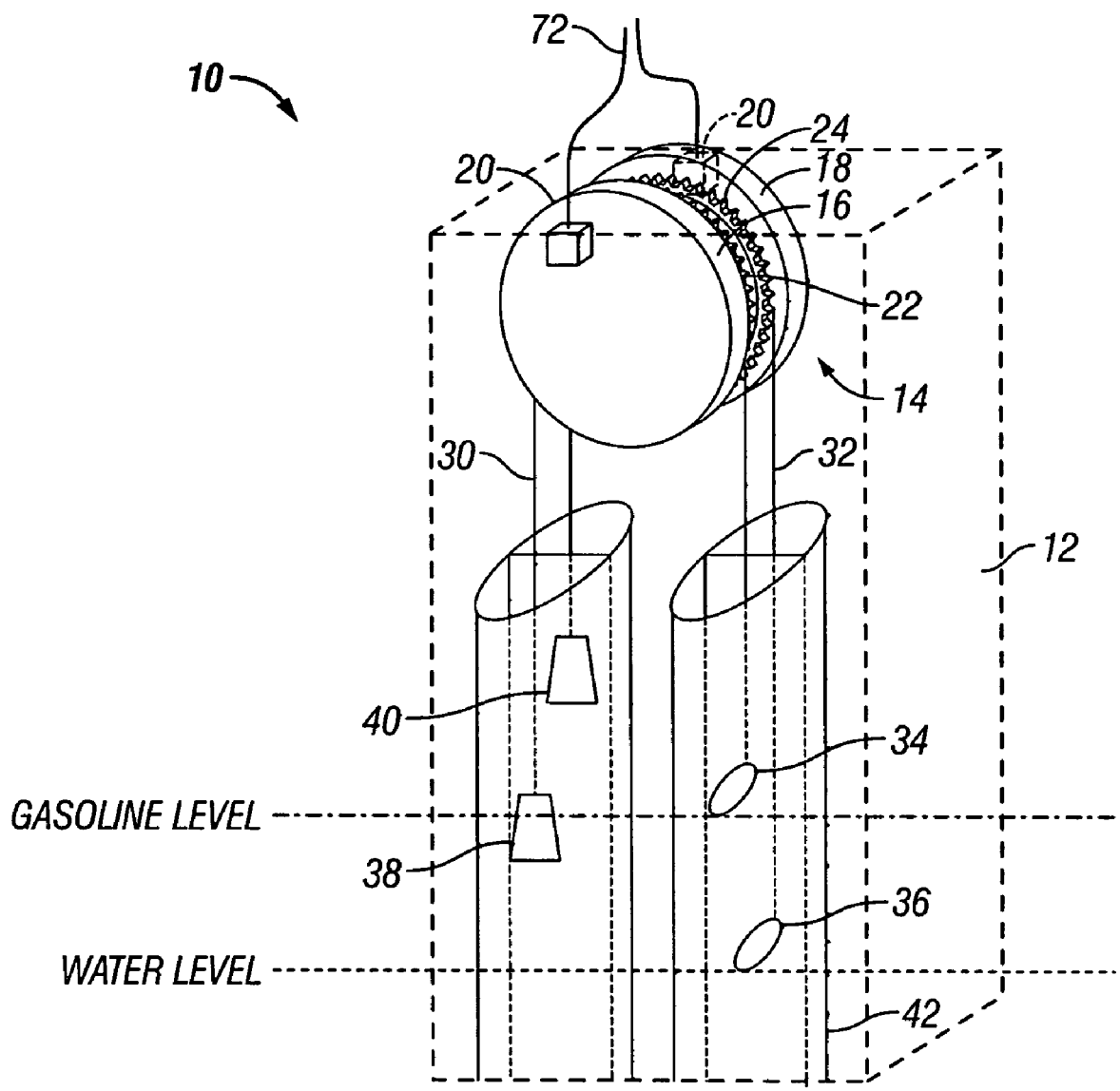
FIG. 4 is perspective view of a liquid measuring system of the present invention showing a pair of guidance tubes for housing a pair of floats and counterweight that are operatively connected to encoder disks to transmit signals regarding the amount of fluid in the storage tank.

As shown in FIGS. 1 and 2, each of the sprockets 22, 24 is attached about its center to a shaft or cylinder 26 that is rotatably attached in a known way to the walls of the storage tank or to other structures within the tank so that each shaft will rotate with its respective sprocket. A steel or aramid cables, ropes, straps, timing belts, link chains, or other known elongated items 30, 32 that may be used with the sprockets (hereinafter generally referred to as "chains") are individually attached to each of the sprockets in a known way. In a preferred embodiment, the hub 28 of each sprocket 22, 24 has projections or teeth that extend outward and fit within corresponding holes or loops in the corresponding chain 30, 32. It also is appreciated that the chains 30, 32 may include projections or teeth that engage corresponding holes or slots on the surface of the hub 28. While the use of sprockets and chains with holes is shown and disclosed, it is appreciated that other types of known pulley wheels and corresponding chains that permit rotation of the pulleys by movement of the chains may be used and not depart from the scope of the present invention.

One end of each of the chains 30, 32 is attached to corresponding floats 34, 36 and the other ends of the chains 30, 32 are attached to corresponding counterweights 38, 40. In order to assist in preventing the chain 30 from slipping about the sprocket 22, it is appreciated that a drone pulley 44 may be attached to the storage tank 12 or structure within the storage tank by a shaft or cylinder 46, so that the outer rim of the drone pulley 44 presses against the chain 30 and/or the teeth of the sprocket 22. A drone pulley may also be attached to the storage tank 12 or structure within the storage tank through a shaft or cylinder so that the outer rim of the drone pulley presses against the chain 32 to prevent the chain 32 from slipping about the sprocket 24.

In operation, the first sprocket 22 and associated chain 30, float 34 and counterweight 38 are used to measure the amount of gasoline in the storage tank, while the second sprocket 24 and associated chain 32, float 36 and counterweight 40 are used to measure the amount of water in the storage tank. As the density of gasoline is about 0.69 grams per milliliter (but may vary depending on the characteristics of the gasoline) and the density of water is about 1.00 grams per milliliter, the first float 34 has a density that is less than the density of gasoline so that it will float on top of the gasoline, and the second float 36 has a density that is greater than density of gasoline and less than the density of water so that it will float on top of the water.

In order to prevent lateral movement of the floats and prevent possible errant measurements, the floats 34, 36 preferably travel within one or two guidance tubes 42. While the tubes may be solid with an opening at or near the bottom so that the liquid will be forced up the tubes, the tubes are preferably perforated to allow for the gasoline and water to flow through the tubes at the respective levels. It is appreciated that the guidance tubes may be attached to the optical liquid measuring device or the storage tank in a known way.

Figure 5:
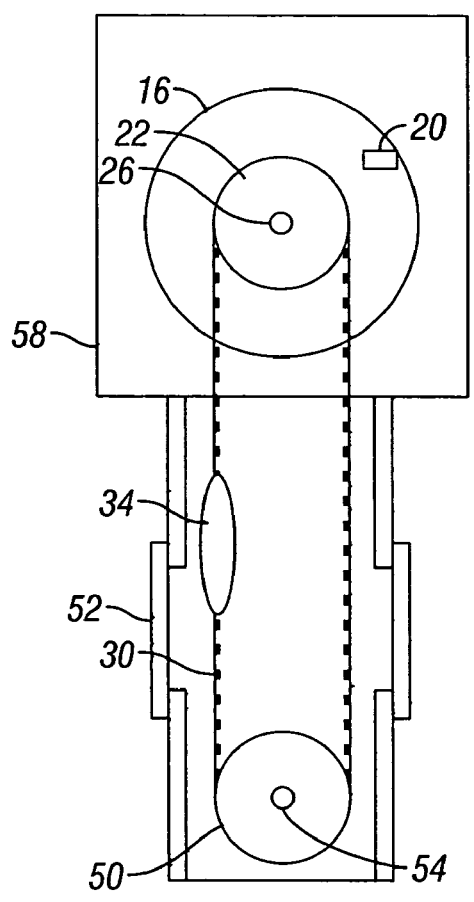
FIG. 5 is a front elevation plan view showing another embodiment of a liquid measuring system of the present invention illustrating a float attached to a continuous loop that extends around two sprockets.
Figure 6:
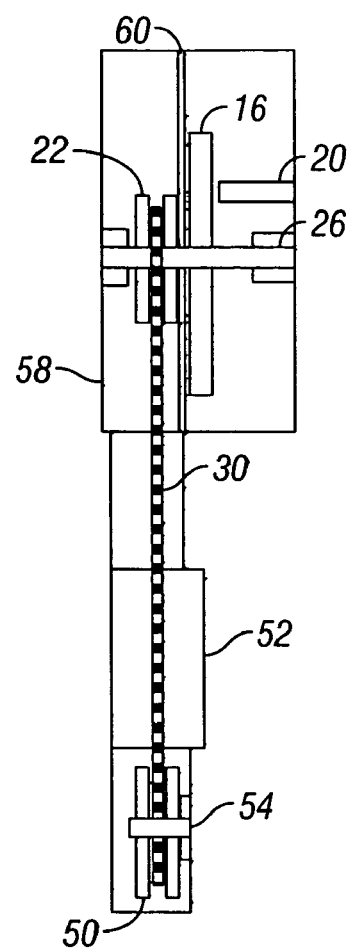
FIG. 6 is a side plan view of the liquid measuring system shown in FIG. 5.

In an alternate embodiment, instead of counterweights, as shown in FIGS. 5 and 6, the pulley system 14 may include a second pulley wheel or sprocket 50 for each sprocket 22, 24 that is attached to a telescoping pulley-support brace 52 by a shaft or cylinder 54. While it is appreciated that the brace may not be telescopic, use of a telescoping brace allows for the system to be effectively used in storage tanks having different depths. In the preferred embodiment, the support brace is substantially U-shaped so that the gasoline and water can flow into the support brace. The support brace is preferably made of aluminum but may be made of other types of materials that will not be aversely affected by water and gasoline and not depart from the scope of the present invention. It is also appreciated that the second pulley wheels may be attached to the bottom or sides of the storage tank in a known way and not depart from the scope of the present invention.

As shown in FIG. 5, the chain 30 forms a continuous loop about the sprocket 22 and one of the second pulley wheels 50. Similarly, the cable 32 forms a continuous loop about the pulley 22 and another of the pulleys 26. In operation, the float 34 is attached to the chain 30 in a known way so that it rises or lowers with the level gasoline in the storage tank, while the float 36 is attached to the chain 32 in a known way so that it rises or lowers with the water level in the storage tank.

Figure 7:
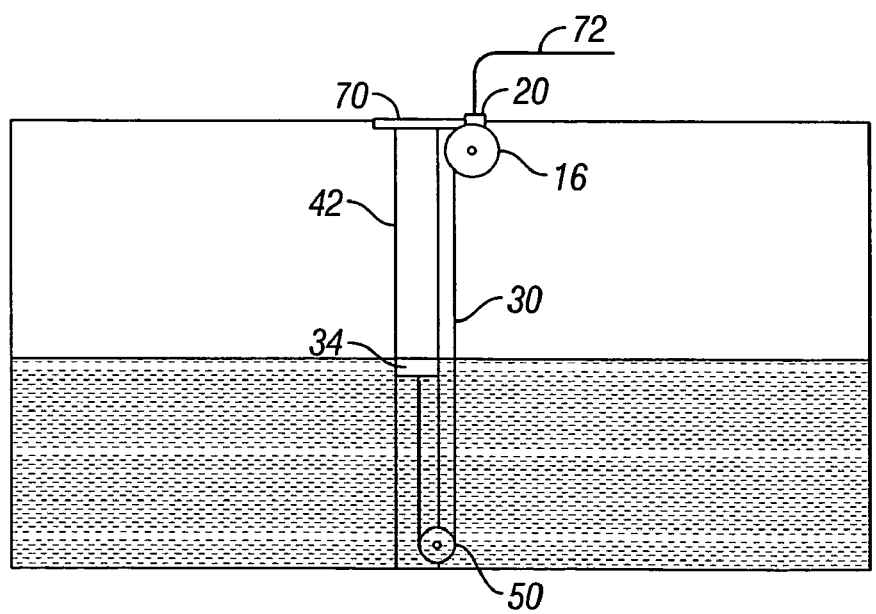
FIG. 7 illustrates a schematic plan view of an alternate embodiment of a liquid measuring system of the present invention utilizing a float attached to a spring-loaded chain or tether that extends about a pulley located within the storage tank.

FIG. 7 shows another embodiment of the pulley system of the present invention utilizing second pulley wheels. Instead of a continuous loop about the second pulley wheel 50, the chain 30 may extend about the one of the second pulley wheels 50 to permit the float 34 at the end of the chain 30 to float on the gasoline. Similarly, the chain 32 may extend about the other second pulley wheel 50 to permit the float 36 at the end of the chain 32 to float in the water. It is appreciated that in order to prevent lateral drift of the floats, the floats may extend in guidance tubes 42 placed in the storage tank. It is further appreciated that the second pulley wheels 50 may be attached to a telescopic support brace, the storage tank or the guidance tube in a known way. In order to maintain tautness in the chains 30, 32, individual springs (not shown) are preferably operatively attached to the ends of the chains 30, 32 about the sprockets 22, 24.

The optical encoder disks 16, 18 are preferably each attached about their center to the shafts or cylinder 26 that are connected to the respective sprockets 22, 24 so that rotation of one of the sprockets 22, 24 also rotates the respective optical encoder disk 16, 18. In a preferred embodiment, an enclosure such as a box or box frame 58 surround the sprocket 22, 24, encoder disks 16, 18 and optical sensor. In order to protect the optical area of the optical liquid measuring device 10 (namely, among other things, the encoder disks 16, 18 and the optical encoder reader heads or optical connectors 20) from damage due to, among other things, liquid splashes, evaporation and condensation, the optical area is preferably protected by a structural barrier 60 that alone, or with the box 58 and/or storage tank 12, acts to hermitically seal the optical area. The encoder disks each preferably include or comprise a mask of a known type to permit pulses to be reflected off of the encoder disks.

Referring again to FIGS. 1 through 7, the optical encoder reader heads or optical connectors 20 are located proximate each of the encoder disks. In a preferred embodiment, the optical connectors are integral with or sealed within the cover 70 of the storage tank so the integrity of the storage tank is not compromised.

Each of the optical connectors or optical encoder reader heads 20 has a plurality of optical fibers 72 associated therewith. In one embodiment, three optical fibers are used wherein two fibers are connected to a light source (such as, but not limited to, a light emitting diode "LED" or a laser) to transmit or deliver light to the mask of the encoder disk. The light then is reflected back from the encoder disk in a known way, and the third optical fiber receives the reflected light. As it is preferred that the encoder disks be absolute encoder disks, it is appreciated that the light source be masked to a narrow beam in a known way. The optical fibers may then transmit signals, which are preferably digital signals, to a photo detector associated with or attached to a photo detector associated with or attached to a central processing unit (CPU) (not shown) of a computer or other receiving device to enable remote determination of the amount of fluid in the storage tank. In particular, the dimensions of the storage tank 12 may be input or imported into, or otherwise accessed by, the CPU in a known way. The CPU may then take the information received from the encoder disks 16, 18 and the optical fibers 72, together with the cross-sectional geometry of the storage tank 12, and accurately calculate the amount of gasoline and water in the storage tank 12 using a simple algorithm. It is also appreciated that the CPU may include a modem or other known means to connect to the Internet to allow for remote monitoring of storage tanks.

While the three optical fiber configuration is preferred, it is appreciated that two, four or any number of optical fibers may be used and not depart from the scope of the present invention. In the case of two optical fibers, it is appreciated that both of the optical fibers may transmit light into corresponding receiving fibers. In the case of four optical fibers, it is appreciated that one of the optical fibers may be redundant for illumination or return signal transmission. It is further appreciated that a splitter may be connected to the optical fibers in a known way to enable bi-directional signal transmission.

In operation, the receiving fibers receive pulses that are reflected off of the encoder disk to transmit information regarding the height or location of the floats in the storage tanks. In order to determine the amount of the change of fluids in the storage tank, it is appreciated that the system be calibrated when the floats are at either the top or bottom of the storage tank. Based upon the number of pulses received, the system may then determine the amount of gasoline and water in the storage tank.

While it is preferred that light be reflected off of the encoder disks, it is appreciated that the light source may be located on the opposite side of a perforated encoder disk as the receiving fiber(s) wherein light may be transmitted from the transmitting fibers through the perforated disk and received by the receiving fibers for transmission to a photo detection or other receiving device.

It should be understood that various modifications, changes and variations may be made in the arrangement, operation and details of construction of the invention disclosed herein without departing from the spirit and scope of the invention. The present disclosure is intended to exemplify and not limit the invention.

We claim:

1. An optical liquid measuring device for determining the amount of flammable liquid in a storage tank that also contains water and/or other contaminant liquids, the optical liquid measuring device comprising:
   a first float having a density that is greater than the flammable liquid but less than the water;
   a second float having a density that is less than the flammable liquid;
   means to convert the vertical displacement of the first and second floats inside the storage tank into digital signals;
   a CPU capable of receiving the digital signals;
   an optical connector for receiving the digital signals;
   fiber optic cables for transmitting the digital signals to the CPU;
   computing means for determining the amount of flammable liquid and water in the storage tank; and a telescoping brace having a bottom, wherein at least one of the second sprockets of the first or second pulley means is attached proximate to the bottom of the telescoping brace.

2. An optical liquid measuring device for determining the amount of flammable liquid in a storage tank that also contains water and/or other contaminant liquids, the optical liquid measuring device comprising:
   a first encoder disk;
   a first optical encoder reader head adjacent the first encoder disk for receiving light that is reflected by or transmitted through the first encoder disk;
   a first float having a density that is greater than the flammable liquid but less than the water;
   first pulley means associated with the first float and operatively connected to the first encoder disk for translating the vertical movement of the first float to the first encoder disk;
   a CPU capable of receiving signals;
   optical fibers connected to the first optical encoder reader head for transmitting signals to the CPU;
   a second encoder disk;
   a second optical encoder reader head adjacent the second encoder disk for receiving light that is reflected by or transmitted through the second encoder disk;
   a second float having a density that is less than the flammable liquid;
   second pulley means associated with the second float and operatively connected to the second encoder disk for translating the vertical movement of the second float to the first encoder disk;
   optical fibers associated with the second optical encoder reader head for transmitting signals to the CPU;
   computing means for determining the amount of flammable liquid and water in the storage tank; and
   a telescoping brace having a bottom, wherein at least one of the first or second pulley means is attached proximate to the bottom of the telescoping brace.

3. The optical liquid measuring device of claim 2 wherein the number of optical fibers connected to each of the first and second encoder reader heads is three.

4. The optical liquid measuring device of claim 3 wherein two optical fibers of each of the first and second encoder head transmit or deliver light to the respective encoder disk and the third optical fiber receives light that is reflected off of the respective encoder disk.

5. The optical liquid measuring device of claim 2 wherein the number of optical fibers connected to the first and second encoder reader heads is two.

6. The optical liquid measuring device of claim 2 wherein the light is generated by a light emitting diode.

7. The optical liquid measuring device of claim 2 wherein the light is generated by a laser.

8. The optical liquid measuring device of claim 2 wherein the signals are detected by a photo detector.

9. The optical liquid measuring device of claim 2 which further comprises a splitter to enable bi-directional signal transmission.

10. The optical liquid measuring device of claim 2 wherein the first and second floats each travel within a tube.

11. The optical liquid measuring device of claim 10 wherein the tube is perforated.

12. The optical liquid measuring device of claim 2 wherein the first and second floats are each attached to a guidance rod.

13. The optical liquid measuring device of claim 2 wherein the CPU comprises means to remotely transmit data.

14. The optical liquid measuring device of claim 13 wherein the means to remotely transmit data is a modem.

15. The optical liquid measuring device of claim 2 wherein the signals are digital.

16. The optical liquid measuring device of claim 2 wherein the number of optical fibers connected to the first and second encoder readers is four.

17. The optical liquid measuring device of claim 2 wherein the first pulley means comprises:
   a sprocket;
   a chain that engages the sprocket, wherein the chain has a first end and a second end, and
   wherein the first end of the chain is attached to the first float; and
   a counterweight attached to the second end;
   and the second pulley means comprises:
   a sprocket;
   a chain that engages the sprocket wherein the chain has a first end and a second end, and
   wherein the first end of the chain is attached to the second float; and
   a counterweight attached to the second end.

18. The optical liquid measuring device of claim 17, which further comprises guidance tubes which encompass the ends of the chains to limit the lateral drift of the floats and counterweights.

19. The optical liquid measuring device of claim 17, which further comprises a pair of drone pulleys that engage the sprockets of the first and second pulleys means to prevent the corresponding chains from slipping.

20. An optical liquid measuring device for determining the amount of flammable liquid in a storage tank that also contains water and/or other contaminant liquids, the optical liquid measuring device comprising:
   a first encoder disk;
   a first optical encoder reader head adjacent the first encoder disk for receiving light that is reflected by or transmitted through the first encoder disk;
   a first float having a density that is greater than the flammable liquid but less than the water;
   first pulley means associated with the first float and operatively connected to the first encoder disk for translating the vertical movement of the first float to the first encoder disk;
   a CPU capable of receiving signals;
   optical fibers connected to the first optical encoder reader head for transmitting signals to the CPU;
   a second encoder disk;
   a second optical encoder reader head adjacent the second encoder disk for receiving light that is reflected by or transmitted through the second encoder disk;
   a second float having a density that is less than the flammable liquid;
   second pulley means associated with the second float and operatively connected to the second encoder disk for translating the vertical movement of the second float to the first encoder disk;
   optical fibers associated with the second optical encoder reader head for transmitting signals to the CPU;
   computing means for determining the amount of flammable liquid and water in the storage tank;
   wherein the storage tank has a top and a bottom, and the first pulley means comprises:

a first sprocket located proximate the top of the storage tank;
a second sprocket located proximate the bottom of the storage tank; and
a chain that forms a loop about the first and second sprockets and which is attached to the first float; and
the second pulley means comprises:
a first sprocket located proximate the top of the storage tank;
a second sprocket located proximate the bottom of the storage tank; and
a chain that forms a loop about the first and second sprockets and which is attached to the first float.

21. The optical liquid measuring device of claim 20, which further comprises a telescoping brace having a bottom, wherein at least one of the second sprockets of the first or second pulley means is attached proximate to the bottom of the telescoping brace.

22. An optical liquid measuring device for determining the amount of flammable liquid in a storage tank that also contains water and/or other contaminant liquids, the optical liquid measuring device comprising:
a first encoder disk;
a first optical encoder reader head adjacent the first encoder disk for receiving light that is reflected by or transmitted through the first encoder disk;
a first float having a density that is greater than the flammable liquid but less than the water;
first pulley means associated with the first float and operatively connected to the first encoder disk for translating the vertical movement of the first float to the first encoder disk;
a CPU capable of receiving signals;
optical fibers connected to the first optical encoder reader head for transmitting signals to the CPU;
a second encoder disk;
a second optical encoder reader head adjacent the second encoder disk for receiving light that is reflected by or transmitted through the second encoder disk;
a second float having a density that is less than the flammable liquid;
second pulley means associated with the second float and operatively connected to the second encoder disk for translating the vertical movement of the second float to the first encoder disk;
optical fibers associated with the second optical encoder reader head for transmitting signals to the CPU;
computing means for determining the amount of flammable liquid and water in the storage tank; and,
wherein the storage tank has a top and a bottom, and the first pulley means comprises:
a first sprocket located proximate the top of the storage tank;
a second sprocket located proximate the bottom of the storage tank;
a chain having a first end and a second end, wherein the chain engages the first sprocket and extends downward and around the second sprocket, and wherein the second end is attached to the first float; and
spring means that bias the chain toward the first sprocket; and the second pulley means comprises:
a first sprocket located proximate the top of the storage tank;
a second sprocket located proximate the bottom of the storage tank; and
a chain having a first end and a second end, wherein the chain engages the first sprocket and extends downward and around the second sprocket and wherein the second end is attached to the second float; and
spring means that bias the chain toward the first sprocket.

23. The optical liquid measuring device of claim 22 which further comprises guidance tubes which encompass the second ends of the chains to limit the lateral drift of the floats.

24. The optical liquid measuring device of claim 2 wherein the first and second encoder disks are perforated and wherein light is transmitted through the first and second encoder disks to the respective first and second optical encoder reader heads.

25. An optical liquid measuring device for determining the amount of liquid in a storage tank, the optical liquid measuring device comprising:
a float having a density that is less than the liquid;
means to convert, the vertical displacement of the float inside the storage tank into digital signals;
a CPU capable of receiving the digital signals;
an optical connector for receiving flue digital signals;
optical fibers for transmitting the digital signals to the CPU;
computing means for determining the amount of liquid in the storage tank;
wherein the storage tank has a top and a bottom, and the first pulley means comprises:
a first sprocket located proximate the top of the storage tank;
a second sprocket located proximate the bottom of the storage tank; and
a chain that forms a loop about the first and second sprockets and which is attached to the first float; and
the second pulley means comprises:
a first sprocket located proximate the top of the storage tank:
a second sprocket located proximate the bottom of the storage tank; and
a chain that forms a loop about the first and second sprockets and which is attached to the first float.

26. The optical liquid measuring device of claim 25 which further comprises:
a second float having a density that is less than water and greater than the liquid;
means to convert the vertical displacement of the second float inside the storage tank into second digital signals that may be received by the CPU;
a second optical connector for receiving the second digital signals; and
second optical fibers for transmitting the second digital signals to the CPU.

27. The optical liquid measuring device of claim 26 wherein the computing means for determining the amount of liquid in the storage tank comprises computing means for determining the amount of water in the storage tank.

28. An optical liquid measuring device for determining the amount of liquid in a storage tank, the optical liquid measuring device comprising:
a first encoder disk;
a first optical encoder reader head adjacent the first encoder disk for receiving light that is reflected by or transmitted through the first encoder disk;
a first float having a density that is less than the liquid;
first pulley means associated with the first float and operatively connected to the first encoder disk for translating the vertical movement of the first float to the first encoder disk;
a CPU capable of receiving signals;

optical fibers connected to the first optical encoder reader head for transmitting signals to the CPU;

computing means for determining the amount of liquid and in the storage tank;

wherein the storage tank has a top and a bottom, and the first pulley means comprises:

a first sprocket located proximate the top of the storage tank;

a second sprocket located proximate the bottom of the storage tank; and a chain that forms a loop about the first and second sprockets and which is attached to the first float; and the second pulley means comprises:

a first sprocket located proximate the top of the storage tank;

a second sprocket located proximate the bottom of the storage tank; and a chain that forms a loop about the first and second sprockets and which is attached to the first float.

29. The optical liquid measuring device of claim 28 which further comprises:

a second encoder disk;

a second optical encoder reader head adjacent the second encoder disk for receiving light that is reflected by or transmitted through the second encoder disk;

a second float for floating on water;

first pulley means associated with the second float and operatively connected to the second encoder disk for translating the vertical movement of the second float to the second encoder disk; and optical fibers connected to the second optical encoder reader head for transmitting signals to the CPU.

30. The optical liquid measuring device of claim 29 wherein the computing means for determining the amount of liquid in the storage tank comprises computing means for determining the amount of water in the storage tank.

* * * * *